United States Patent
Wang et al.

(10) Patent No.: US 11,581,521 B2
(45) Date of Patent: Feb. 14, 2023

(54) THICK, FLEXIBLE CATHODES FOR LITHIUM-ION BATTERIES

(71) Applicant: GM GLOBAL TECHNOLOGY OPERATIONS LLC, Detroit, MI (US)

(72) Inventors: Meixian Wang, Warren, MI (US); Raghunathan K, Troy, MI (US); Niccolo Jimenez, Troy, MI (US); Ion C. Halalay, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 364 days.

(21) Appl. No.: 16/910,456

(22) Filed: Jun. 24, 2020

(65) Prior Publication Data

US 2021/0408518 A1    Dec. 30, 2021

(51) Int. Cl.
| | |
|---|---|
| *H01M 4/131* | (2010.01) |
| *H01M 4/505* | (2010.01) |
| *H01M 10/0525* | (2010.01) |
| H01M 4/02 | (2006.01) |

(52) U.S. Cl.
CPC ........... *H01M 4/131* (2013.01); *H01M 4/505* (2013.01); *H01M 10/0525* (2013.01); *H01M 2004/021* (2013.01); *H01M 2004/028* (2013.01)

(58) Field of Classification Search
CPC .. H01M 4/131; H01M 4/505; H01M 10/0525; H01M 2004/021; H01M 2004/028; H01M 4/0404; H01M 4/1391; Y02E 60/10
See application file for complete search history.

(56) References Cited

U.S. PATENT DOCUMENTS

| | | | |
|---|---|---|---|
| 2010/0086837 A1* | 4/2010 | Asari | H01G 11/36 |
| | | | 29/623.5 |
| 2013/0143090 A1* | 6/2013 | Hosoya | H01M 50/103 |
| | | | 429/94 |
| 2020/0194777 A1 | 6/2020 | Chen et al. | |

FOREIGN PATENT DOCUMENTS

| | | | | |
|---|---|---|---|---|
| CN | 105921887 A | | 9/2016 | |
| JP | 11-040146 | * | 2/1999 | H01M 4/24 |

OTHER PUBLICATIONS

Machine translation of JP 11-040146, retrieved from <https://dialog.proquest.com> on Oct. 12, 2022.*

* cited by examiner

*Primary Examiner* — Cynthia K Walls
(74) *Attorney, Agent, or Firm* — Vivacqua Crane PLLC

(57) ABSTRACT

A lithium metal oxide (LMO) cathode includes a current collector having a length defining a first end and a second end, a width, and a first side and a second side, LMO active material applied to the first side and the second side of the current collector such that the LMO active material applied to each respective side of the current collector has an inner face contiguous with the current collector and an outer face, and a plurality of channels extending widthwise across the cathode within the LMO active material applied to the first and second sides. The LMO active material on each current collector side can have a thickness of about 100 μm to about 400 μm. The channels on the same side of the current collector can be spaced apart by 0.1 mm to 10 mm. The channels can have widths of 10 μm to 60 μm.

18 Claims, 2 Drawing Sheets

THICK, FLEXIBLE CATHODES FOR LITHIUM-ION BATTERIES

INTRODUCTION

Lithium-ion batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium batteries are growing in popularity for defense, automotive, and aerospace applications due to their high energy density and ability to undergo successive charge and discharge cycles.

SUMMARY

Lithium metal oxide (LMO) cathodes are provided and can include a current collector having a length defining a first end and a second end, a width, and a first side and a second side. LMO active material can be applied to the first side and the second side of the current collector such that the LMO active material applied to each respective side of the current collector has an inner face contiguous with the current collector and an outer face. A plurality of channels can extend widthwise across the cathode within the LMO active material applied to the first side and the LMO active material applied to the second side. The respective LMO active material applied to each of the first side and the second side of the current collector can have a thickness of about 100 µm to about 400 µm. The channels in the respective LMO active material applied to the first side and the second side of the current collector can be spaced at most 3 mm apart. The channels in the respective LMO active material applied to the first side and the second side of the current collector can be spaced apart by 0.1 mm to 10 mm. The channels in the respective LMO active material applied to the first side and the second side of the current collector can have widths of 10 µm to 60 µm. The channels in the respective LMO active material applied to the first side and the second side of the current collector can extend inward from the respective outer surfaces of the LMO active materials to a depth that is 25% to 75% of the thickness of the respective LMO active material. The channels in the respective LMO active material applied to the first side and the second side of the current collector can extend inward from the respective outer surfaces of the LMO active materials by depths that increase as the channels approach the lengthwise center of the cathode. The lengthwise center-most channels in the respective LMO active material applied to the first side and the second side of the current collector can extend inward from the respective outer surfaces of the LMO active materials to a depth that is 90% to 100% of the thickness of the respective LMO active material, and the lengthwise outer-most channels in the respective LMO active material applied to the first side and the second side of the current collector can extend inward from the respective outer surfaces of the LMO active materials to a depth that is at most 50% of the thickness of the respective LMO active material. The current collector can have a width of 125 mm to 175 mm and a length of 400 mm to 600 mm. The LMO active material can be one or more of $Li_{x+y}Mn_{2-y}O_4$, wherein $0<x<1$ and $0<y<0.1$, and $Li_2MnO_3$.

Lithium battery cells are provided and can include an electrolyte, an anode disposed within the electrolyte, and a cathode disposed within the electrolyte. The cathode can include a current collector having a length defining a first end and a second end, a width, and a first side and a second side. LMO active material can be applied to the first side and the second side of the current collector such that the LMO active material applied to each respective side of the current collector has an inner face contiguous with the current collector and an outer face. A plurality of channels can extend widthwise across the cathode within the LMO active material applied to the first side and the LMO active material applied to the second side. The current collector can have a width of 125 mm to 175 mm and a length of 400 mm to 600 mm. The LMO active material comprises $Li_{x+y}Mn_{2-y}O_4$ wherein $0<x<1$ and $0<y<0.1$ and $Li_2MnO_3$ and the anode can be one or more of graphite and silicon. The respective LMO active material applied to each of the first side and the second side of the current collector can have a thickness of about 100 µm to about 400 µm and the anode can have a total thickness of about 50 µm to 200 µm. The channels in the respective LMO active material applied to the first side and the second side of the current collector can be spaced at most 3 mm apart. The channels in the respective LMO active material applied to the first side and the second side of the current collector can be spaced apart by 0.1 mm to 10 mm. The channels in the respective LMO active material applied to the first side and the second side of the current collector can have widths of 10 µm to 60 µm. The channels in the respective LMO active material applied to the first side and the second side of the current collector can extend inward from the respective outer surfaces of the LMO active materials to a depth that is 25% to 75% of the thickness of the respective LMO active material. The channels in the respective LMO active material applied to the first side and the second side of the current collector can extend inward from the respective outer surfaces of the LMO active materials by depths that increase as the channels approach the lengthwise center of the cathode. The lengthwise center-most channels in the respective LMO active material applied to the first side and the second side of the current collector can extend inward from the respective outer surfaces of the LMO active materials to a depth that is 90% to 100% of the thickness of the respective LMO active material, and the lengthwise outer-most channels in the respective LMO active material applied to the first side and the second side of the current collector can extend inward from the respective outer surfaces of the LMO active materials to a depth that is at most 50% of the thickness of the respective LMO active material.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are electrodes with channeled active materials and methods for manufacturing the same. During manufacturing, the channels formed in the active/host materials reduce drying time of the active material and lend sufficient flexibility to the electrode so that roll-to-roll processing techniques may be utilized without cracking or otherwise compromising the mechanical integrity of the electrode. When incorporated in a battery cell, the channeled active materials exhibit higher durability (e.g., reduced or eliminated delamination and/or cracking of the active material) and further reduce electrode tortuosity, and overall cell resistance, by providing faster diffusion of ions through the electrolyte.

Figure 1A:
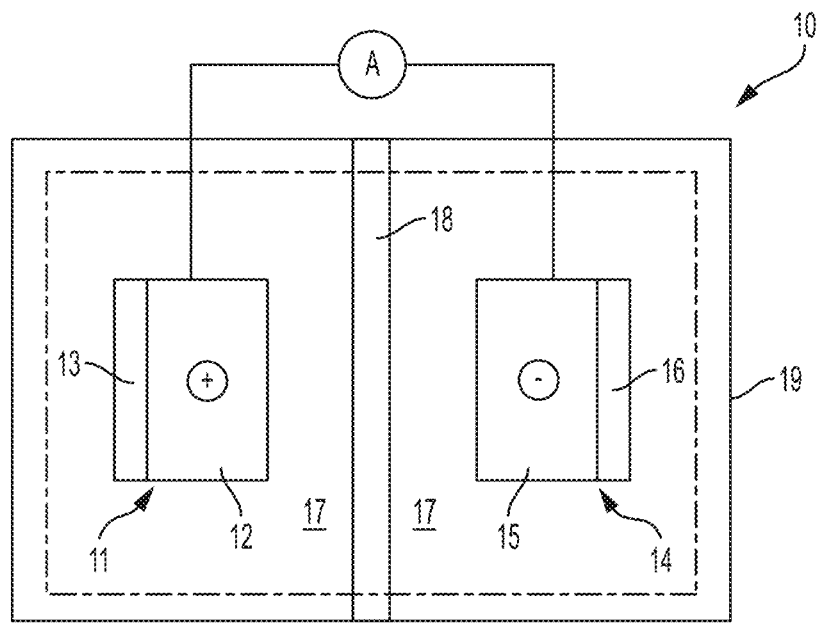
FIG. 1A illustrates a lithium battery cell, according to one or more embodiments.

FIG. 1A illustrates a lithium battery cell 10 comprising a positive electrode (i.e., the cathode) 14, a negative electrode (i.e., the anode) 11, an electrolyte 17 operatively disposed between the anode 11 and the cathode 14, and a separator 18. Anode 11, cathode 14, and electrolyte 17 can be encapsulated in container 19, which can be a hard (e.g., metallic) case or soft (e.g., polymer) pouch, for example. The anode 11 and cathode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Cathode 14 generally includes a current collector 15 and a lithium active material 16 (e.g., a lithium alloy, metallic lithium, etc.) applied thereto. Anode 11 generally includes a current collector 12 and a host material 13 applied thereto.

Figure 1B:
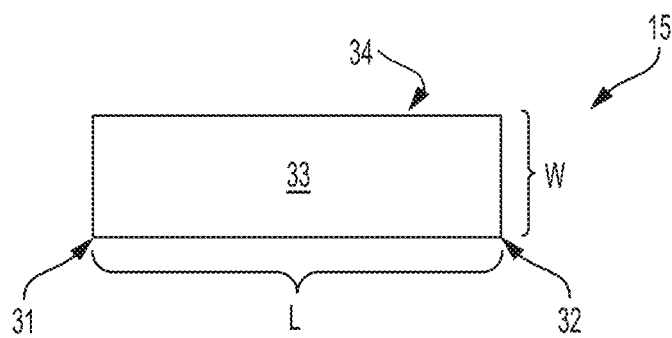
FIG. 1B illustrates a top view of a current collector, according to one or more embodiments.

FIG. 1B illustrates a top view of a cathode current collector 15, defined by a width W and a length L, the latter defining a first end 31 and a second end 32. Length L and width W define a first side 33 and a second side 34 (opposite first side 33), each suitable for application of active material 16 thereon. Cathode current collector 15 as defined by length L and width W is illustrated as rectangular, but other shapes are practicable, such as ovular shapes wherein the length L comprises an average length and the width W comprises an average width, for example.

Active material 16 can store lithium ions at a lower electric potential than host material 13, for example. The current collectors 12 and 15 associated with the two electrodes are connected by an interruptible external circuit that allows an electric current to pass between the electrodes to electrically balance the related migration of lithium ions. Although FIG. 1A illustrates host material 13 and active material 16 schematically for the sake of clarity, host material 13 and active material 16 can comprise an exclusive interface between the anode 11 and cathode 14, respectively, and electrolyte 17.

Figure 2:
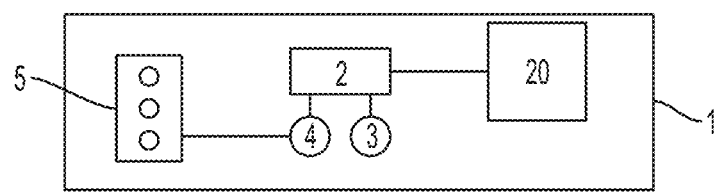
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. Vehicle 1 can optionally include an engine 5 which can, for example, be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Battery cell 10 generally operates by reversibly passing lithium ions between anode 11 and cathode 14. Lithium ions move from cathode 14 to anode 11 while charging and move from anode 11 to cathode 14 while discharging. At the beginning of a discharge, anode 11 contains a high concentration of intercalated/alloyed lithium ions while cathode 14 is relatively depleted and establishing a closed external circuit between anode 11 and cathode 14 under such circumstances causes intercalated/alloyed lithium ions to be extracted from anode 11. The extracted lithium atoms are split into lithium ions and electrons as they leave an intercalation/alloying host at an electrode-electrolyte interface. The lithium ions are carried through the micropores of separator 18 from anode 11 to cathode 14 by the ionically conductive electrolyte 17 while, at the same time, the electrons are transmitted through the external circuit from cathode 14 to anode 11 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium battery cell, an external power source (not shown) is connected to the positive and the negative electrodes to drive the reverse of battery discharge electrochemical reactions. That is, during charging, the external power source extracts the lithium ions present in cathode 14 to produce lithium ions and electrons. The lithium ions are carried back through the separator by the electrolyte solution, and the electrons are driven back through the external circuit, both towards anode 11. The lithium ions and electrons are ultimately reunited at the negative electrode, thus replenishing it with intercalated/alloyed/metallic lithium for future battery cell discharge.

Lithium battery cell 10, or a battery module or pack comprising a plurality of battery cells 10 connected in series and/or in parallel, can be utilized to reversibly supply power and energy to an associated load device. Lithium batteries may also be used in various consumer electronic devices (e.g., laptop computers, cameras, and cellular/smart phones), military electronics (e.g., radios, mine detectors, and thermal weapons), aircrafts, and satellites, among others. Lithium batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1A, electrolyte 17 conducts lithium ions between anode 11 and cathode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, LiI, LiBr, LiSCN, $LiBF_4$, $LiB(C_6H_5)_4LiAsF_6$, $LiCF_3SO_3$, $LiN(CF_3SO_2)_2$, $LiN(FSO_2)_2$, $LiPF_6$, and mixtures thereof.

The separator 18 can comprise, for example, one or more polymeric materials including polyolefins (e.g., polyethylene, polypropylene), polyethylene terephthalate (PET), polyvinylidene fluoride (PVdF), and or a polyamide (Nylon), among others. Separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium batteries, such as battery cell 10. Skilled artisans will undoubtedly know and understand the many available polymers and commercial products from which the microporous polymer separator 18 may be fabricated, as well as the many manufacturing methods that may be employed to produce the microporous polymer separator 18.

The cathode current collector 15 can include aluminum or any other appropriate electrically conductive material known to skilled artisans. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others.

Active material 16 can include any lithium-based active material that can sufficiently undergo lithium intercalation and deintercalation while functioning as the positive terminal of battery cell 10. One common class of known materials that can be used to form active material 16 is lithium transitional metal oxides. For example, in various embodiments, active material 16 can comprise one or more of spinel lithium manganese oxide (LiMn2O4), lithium cobalt oxide (LiCoO2), a nickel-manganese-cobalt oxide [Li(NixMnyCoz)O2], or a lithium iron polyanion oxide such as lithium iron phosphate (LiFePO4) or lithium iron fluorophosphate (Li2FePO4F) intermingled in at least one of polyvinyldiene fluoride (PVdF), an ethylene propylene diene monomer (EPDM) rubber, carboxymethoxyl cellulose (CMC), and styrene, 1,3-butadiene polymer (SBR). Other lithium-based active materials can also be utilized besides those just mentioned. Those alternative materials include, but are not limited to, lithium nickel oxide (LiNiO2), lithium aluminum manganese oxide (LixAlyMn1-yO2), lithium vanadium oxide (LiV2O5), and lithium manganese oxides (LMO), among others. LMO active materials particularly suitable for the embodiments disclosed herein include $Li_{x+y}Mn_{2-y}O_4$ wherein 0<x<1 and 0<y<0.1 (e.g., $LiMn_2O_4$) and $Li_2MnO_3$.

Figure 3:
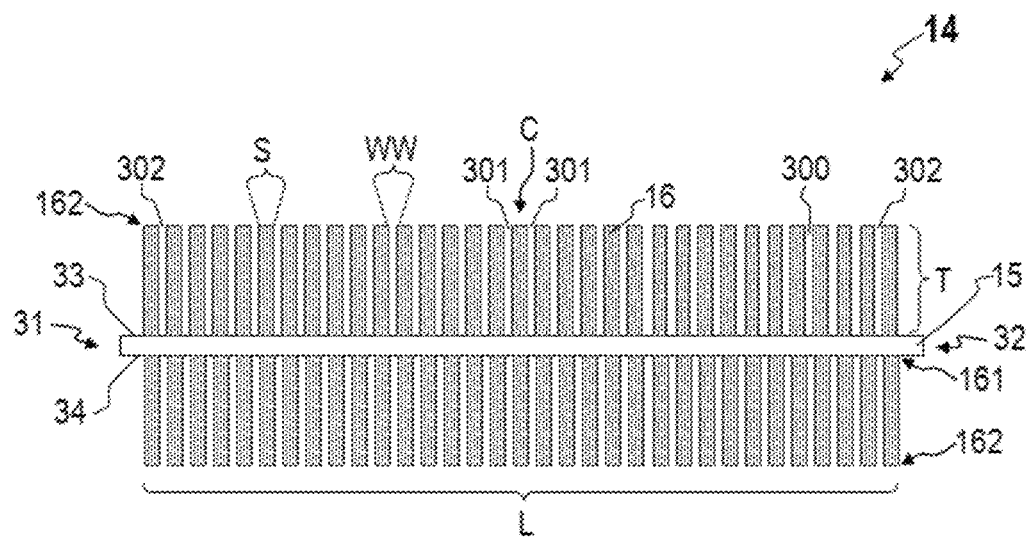
FIG. 3 illustrates a side-view of cathode with channeled active material, according to one or more embodiments.

FIG. 3 illustrates a side-view of cathode 14 comprising a current collector 15 having a length L defining a first side 31 and a second side 32, LMO active material 16 applied to the first side 33 and the second side 34 of the current collector 15 such that the LMO active material 16 applied to each respective side of the current collector 15 has an inner face 161 contiguous with the current collector 15 and an outer face 162. Cathode 14 further comprises a plurality of channels 300 extending widthwise WW across the cathode 14 within the LMO active material 16 applied to the first side 33 and the LMO active material 16 applied to the second side 34. The respective LMO active material 16 applied to each of the first side 33 and the second side 34 of the current collector can have a thickness of about 100 μm to about 400 μm. The channels 300 can be spaced relative to one another with a spacing S of 0.1 mm to 10 mm, or at most 3 mm, in some embodiments. The channels can have widths of 10 μm to 60 μm, in some embodiments.

As shown in FIG. 3, the channels 300 in the respective LMO active material 16 applied to the first side 33 and the second side 34 of the current collector 15 extend inward from the respective outer surfaces 162 of the LMO active materials 16 to a depth that is 100% of the thickness T of the respective LMO active material 16. However, in some embodiments, the channels 300 can extend inward from the respective outer surfaces 162 of the LMO active materials to a depth that is 25% to 75%, 40% to 60%, or about 50% of the thickness T of the respective LMO active material 16. In other embodiments, the channels 300 in the respective LMO active material 16 applied to the first side 33 and the second side 34 of the current collector 15 extend inward from the respective outer surfaces 162 of the LMO active materials 16 by depths that increase as the channels 300 approach the lengthwise center C of the cathode 14.

In some such embodiments, the lengthwise center-most channels 301 in the respective LMO active material 16 applied to the first side 33 and the second side 34 of the current collector 15 extend inward from the respective outer surfaces 162 of the LMO active materials 16 to a depth that is 90% to 100% of the thickness T of the respective LMO active material 16, and the lengthwise outer-most channels 302 in the respective LMO active material 16 applied to the first side 33 and the second side 34 of the current collector 15 extend inward from the respective outer surfaces 162 of the LMO active materials 16 to a depth that is at most 50% of the thickness T of the respective LMO active material 16. Such embodiments advantageously reduce processing time required to form channels 300 with thicknesses 100% of the thickness T of the LMO active material 16 into which they are formed, and further provide an increased amount of LMO active material 16 (relative to a cathode with channel 300 thicknesses of 100% of the thickness T of the LMO active material 16) while still lending flexibility to the cathode 14.

In various embodiments the current collector can have a width of 125 mm to 175 mm or about 150 mm, and a length of 400 mm to 600 mm or about 500 mm. In a particular embodiment, a battery cell 10 can comprise a cathode comprising channels 300 in the LMO active material 16, wherein the respective LMO active material 16 applied to each of the first side 33 and the second side 34 of the current collector 15 has a thickness of about 100 µm to about 400 µm, and the battery cell 10 further includes an anode 11 with a total thickness of about 50 µm to 200 µm.

The anode current collector 12 can include copper, nickel, stainless steel, or any other appropriate electrically conductive material known to skilled artisans, and can be formed in a foil or grid shape, for example. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others.

Host material 13 can include any lithium host material that can sufficiently undergo lithium ion intercalation, deintercalation, and alloying, while functioning as the negative terminal of the lithium ion battery 10. Host material 13 can also include a polymer binder material to structurally hold the lithium host material together. Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders. Graphite and carbon materials are widely utilized to form the negative electrode because it exhibits favorable lithium ion intercalation and deintercalation characteristics, is relatively non-reactive, and can store lithium ions in quantities that produce a relatively high energy density. Other materials can also be used to form the host material 13, for example, including one or more of lithium metal, lithium titanate, silicon, silicon oxide, tin, and tin oxide.

Figure 4:
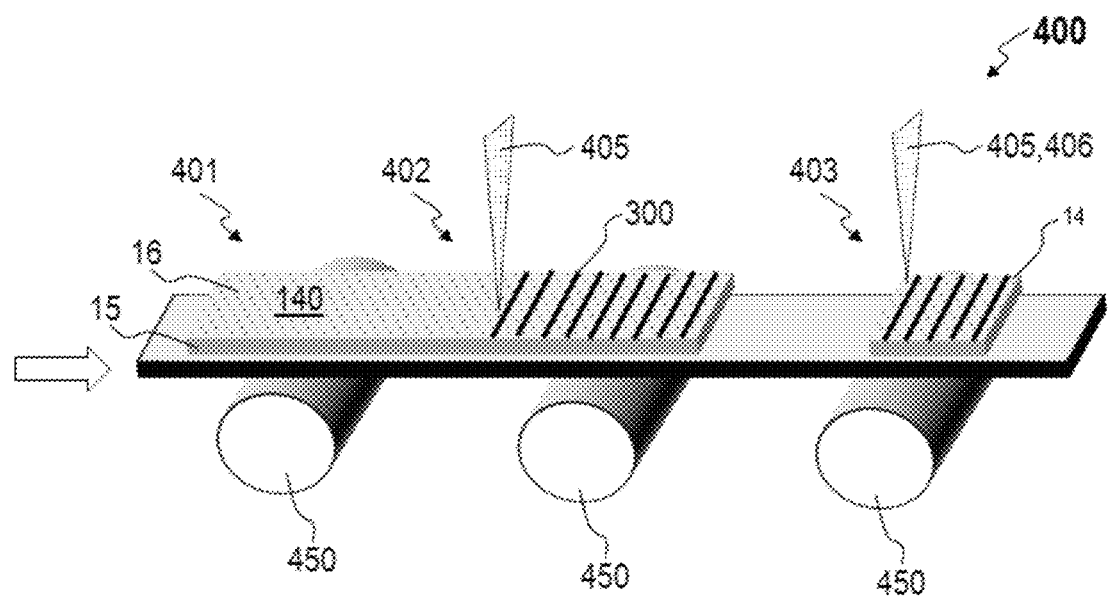
FIG. 4 illustrates a schematic of a method for manufacturing channeled cathodes, according to one or more embodiments.

FIG. 4 illustrates a schematic of a method 400 for manufacturing cathodes 14 described in relation to FIG. 3. Method 400 advantageously increases the macro-surface area of the active material 16 and accordingly increases the power density of a cell (e.g., lithium cell 10) into which the cathode 14 is integrated. Method 400 comprises providing 401 a cathode blank 140 comprising a current collector 15 and a LMO active material 16 applied thereto, forming 402 a plurality of channels 300 within the LMO active material 16, and trimming 403 the current collector 15 to form one or more channeled cathodes 14. The plurality of channels 300 are formed 402 using an energy source 405, such as an electron beam or a laser. The current collector 15 can be trimmed 403 using an energy source 405, or by various other means 406, such as a mechanical trimmer. Trimming 403 can occur before forming 402 the plurality of channels 300, or after forming 402 the plurality of channels 300. Method 400 is known as a roll-to-roll process, and the channels 300 are formed 402 parallel to the rollers 450 to facilitate movement of the cathode blank 140 between several rollers 450.

Providing 301 a cathode blank 140 can comprise providing a cathode 14 with active material 16 applied to a first side 33 and optionally a second side 34 of the current collector 15. Accordingly, forming 402 a plurality of channels 300 within the LMO active material 16 can include forming 402 a plurality of channels 300 within the LMO active material 16 applied to the first side 33 of the current collector 15 and optionally the second side 34 of the current collector 15. Providing 401 a cathode blank 140 can comprise applying a LMO active material 16 to the first surface 33 of the current collector 15 and optionally the second side 34 of the current collector 15.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A lithium metal oxide (LMO) cathode for a lithium battery cell comprising:
    a current collector having a length, the length defining a first end and a second end, a width, and a first side and a second side;
    LMO active material applied to the first side and the second side of the current collector such that the LMO active material applied to each respective side of the current collector has an inner face contiguous with the current collector and an outer face; and
    a plurality of channels extending widthwise across the cathode within the LMO active material applied to the first side and the LMO active material applied to the second side;
    wherein the channels in the respective LMO active material applied to the first side and the second side of the current collector extend inward from the respective outer surfaces of the LMO active materials by depths that increase as the channels approach a lengthwise center of the cathode;
    wherein the LMO cathode is part of the lithium battery cell.

2. The cathode of claim 1, wherein the respective LMO active material applied to each of the first side and the second side of the current collector has a thickness of about 100 µm to about 400 µm.

3. The cathode of claim 1, wherein the channels in the respective LMO active material applied to the first side and the second side of the current collector are spaced at most 3 mm apart.

4. The cathode of claim 1, wherein the channels in the respective LMO active material applied to the first side and the second side of the current collector are spaced apart by 0.1 mm to 10 mm.

5. The cathode of claim 1, wherein the channels in the respective LMO active material applied to the first side and the second side of the current collector have widths of 10 µm to 60 µm.

6. The cathode of claim 1, wherein the channels in the respective LMO active material applied to the first side and the second side of the current collector extend inward from the respective outer surfaces of the LMO active materials to a depth that is 25% to 75% of a thickness of the respective LMO active material.

7. The cathode of claim 1, wherein lengthwise center-most channels in the respective LMO active material applied to the first side and the second side of the current collector extend inward from the respective outer surfaces of the LMO active materials to a depth that is 90% to 100% of a thickness of the respective LMO active material, and lengthwise outer-most channels in the respective LMO active material applied to the first side and the second side of the current collector extend inward from the respective outer surfaces of the LMO active materials to a depth that is at most 50% of the thickness of the respective LMO active material.

8. The cathode of claim 1, wherein the current collector has a width of 125 mm to 175 mm and a length of 400 mm to 600 mm.

9. The cathode of claim 1, wherein the LMO active material comprises one or more of $Li_{x+y}Mn_{2-y}O_4$, wherein $0<x<1$ and $0<y<0.1$, and $Li_2MnO_3$.

10. A lithium battery cell, comprising:
an electrolyte;
an anode disposed within the electrolyte; and
a cathode disposed within the electrolyte, wherein the cathode includes:
a current collector having a length, the length defining a first end and a second end, a width, and a first side and a second side,
LMO active material applied to the current collector such that the LMO active material applied to each respective side of the current collector has an inner face contiguous with the current collector and an outer face, and
a plurality of channels extending widthwise across the cathode within the LMO active material applied to the first side and the LMO active material applied to the second side; and
wherein the channels in the respective LMO active material applied to the first side and the second side of the current collector extend inward from the respective outer surfaces of the LMO active materials by depths that increase as the channels approach a lengthwise center of the cathode.

11. The lithium battery cell of claim 10, wherein the current collector has a width of 125 mm to 175 mm and a length of 400 mm to 600 mm.

12. The lithium battery cell of claim 10, wherein the LMO active material comprises $Li_{x+y}Mn_{2-y}O_4$ wherein $0<x<1$ and $0<y<0.1$, and $Li_2MnO_3$ and the anode comprises one or more of graphite and silicon.

13. The lithium battery cell of claim 10, wherein the respective LMO active material applied to each of the first side and the second side of the current collector has a thickness of about 100 μm to about 400 μm and the anode has a total thickness of about 50 μm to 200 μm.

14. The lithium battery cell of claim 10, wherein the channels in the respective LMO active material applied to the first side and the second side of the current collector are spaced at most 3 mm apart.

15. The lithium battery cell of claim 10, wherein the channels in the respective LMO active material applied to the first side and the second side of the current collector are spaced apart by 0.1 mm to 10 mm.

16. The lithium battery cell of claim 10, wherein the channels in the respective LMO active material applied to the first side and the second side of the current collector have widths of 10 μm to 60 μm.

17. The lithium battery cell of claim 10, wherein the channels in the respective LMO active material applied to the first side and the second side of the current collector extend inward from the respective outer surfaces of the LMO active materials to a depth that is 25% to 75% of a thickness of the respective LMO active material.

18. The lithium battery cell of claim 10, wherein lengthwise center-most channels in the respective LMO active material applied to the first side and the second side of the current collector extend inward from the respective outer surfaces of the LMO active materials to a depth that is 90% to 100% of a thickness of the respective LMO active material, lengthwise outer-most channels in the respective LMO active material applied to the first side and the second side of the current collector extend inward from the respective outer surfaces of the LMO active materials to a depth that is at most 50% of the thickness of the respective LMO active material, and the LMO active material comprises one or more of $Li_{x+y}Mn_{2-y}O_4$, wherein $0<x<1$ and $0<y<0.1$, and $Li_2MnO_3$.

* * * * *